United States Patent

[11] 3,589,357

| [72] | Inventor | James B. Mabry<br>Wellington Road, Route 4, Box 438A,<br>Burlington, N.C. 27215 |
|---|---|---|
| [21] | Appl. No. | 775,278 |
| [22] | Filed | Nov. 13, 1968 |
| [45] | Patented | June 29, 1971 |

[54] NOVELTY FINGER-PUNCTURING DEVICE
3 Claims, 7 Drawing Figs.

[52] U.S. Cl. .................................................. 128/2,
128/329, 128/333
[51] Int. Cl. .................................................. A61b 10/00,
A61b 17/34
[50] Field of Search ........................................... 128/2, 329,
333

[56] References Cited
UNITED STATES PATENTS
| 2,646,799 | 7/1953 | Jacoby, Jr. ............... | 128/329 X |
| 2,845,065 | 7/1958 | Gabriel..................... | 128/215 |
| 2,869,338 | 1/1959 | Norgaard et al. ......... | 128/329 X |
| 3,299,891 | 1/1967 | Smeton ..................... | 128/218 |

*Primary Examiner*—Channing L. Pace
*Attorney*—David Rabin

ABSTRACT: A novelty finger-puncturing device to obtain blood from children for analysis in which a grotesque figure has a finger-receiving cavity with the head of the figure having a finger-puncturing blade in juxtaposition to the finger-receiving cavity with the head of the figure being pivotally mounted to the body whereby upon subjecting the pivotal head to a force the finger-puncturing blade will penetrate the finger for a predetermined depth to obtain a blood sample after which the blade may be removed and the novelty finger-puncturing device may be given to the child as a toy.

PATENTED JUN29 1971

3,589,357

*INVENTOR.*
JAMES B. MABRY

NOVELTY FINGER-PUNCTURING DEVICE

BACKGROUND AND OBJECTIVES OF INVENTION

Laboratory technicians, pediatricians and other doctors experience difficulty in obtaining blood specimens from children who are frequently frightened by the various instruments used by such persons to obtain blood samples. Although various toys and inducements have been made to children to distract them from the business at hand, the children are most perceptive and dread the ordeal of being injected by a hypodermic syringe or a finger punctured by a needle or blade. If the period of time within which the child is subjected to this ordeal could be shortened and the experience made pleasant, the frightening experience may be substantially alleviated.

In the past, hypodermic syringes have been camouflaged by various types of animals or toys which are then presented to the child after the injection or inoculation. Sometimes a needleless syringe is given to the child as a reward for not crying.

This invention has as one of its objectives the provision of a novelty toy which may be in the form of a grotesque figure, such as a clown, or an animal, in which there is concealed a finger-puncturing needle or blade that may be readily removed after the blood sample has been obtained and the toy is then given to the child. The figure is provided with a finger-receiving cavity and as the technician or doctor explains to the child the operation of the unit, the head of the figure may be pivoted and the blood sample removed rapidly before the child even becomes anxious of what will take place. As a matter of fact, the child may be asked to operate the device himself under the direction of a technician or doctor.

There is also provided in the novelty finger-puncturing device of this invention a built-in safety factor which limits the depth of penetration of the needle or blade into the finger so that the depth of penetration may be constant. The grotesque figure is provided with yieldable means for pivoting the head of the figure into a normal position which will conceal the functioning blade and there is sufficient spring action to urge the blade through a suitable blade-receiving guide slot to retract the head from the blade puncturing position instantaneously after the puncture has been made.

The size and configuration of the figure may vary as well as the materials from which it may be made taking into consideration that some doctors may wish to have devices that are not giveaway units for retention in their offices.

BRIEF DESCRIPTION OF PREFERRED EMBODIMENT OF INVENTION

A better understanding of this invention will be described upon consideration of a preferred embodiment shown in the accompanying drawing or the novelty finger-puncturing device in which like characters of reference designate corresponding parts throughout the several views, and wherein.

DETAILED DESCRIPTION OF INVENTION

Figure 1:
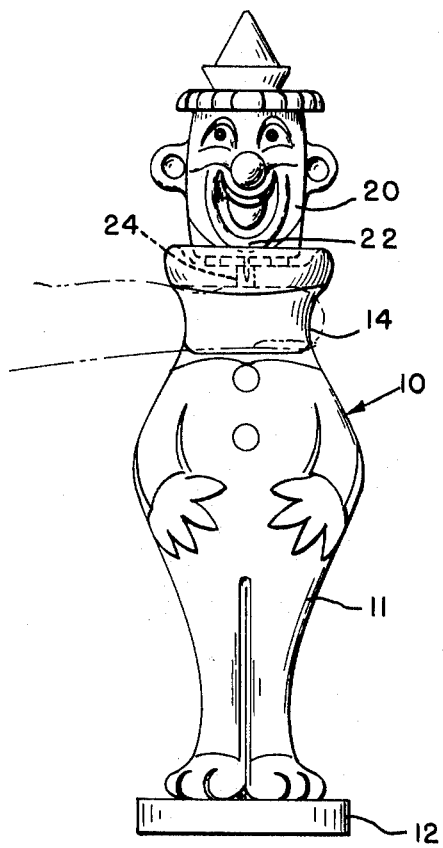
FIG. 1 is a front elevational view of a novelty finger-puncturing device embodying this invention illustrating, in outline form, a finger in position to be punctured.

Referring to the drawing and particularly to FIGS. 1 through 5, there is illustrated one preferred embodiment of this invention for a novelty finger-puncturing device 10 in the form of a grotesque figure in the shape of a clown but it is to be recognized that other figures and shapes including animals, humans and birds, as well as fish, may be utilized as well and when the term "head" is used, it is intended to include the heads of the aforesaid species, and when the term "body" is used, it may be for the aforementioned species and other configurations.

In FIG. 10, the base or body portion 11 has a flat pedestal 12 for supporting the FIG. 10 in an upright vertical position on a flat table or desk. The ornamentation and configuration of the body 11 may vary depending upon the figure which is intended to be portrayed and the illustrative form in the shape of a clown is only one of innumerable configurations. The upper portion or region 13 of body 11 in the vicinity of the neck is provided with a finger-receiving cavity or recess 14 that has an arcuate rear wall 15 against which a finger 16 may be positioned and retained with the arcuate wall 15 having forwardly reaching bottom and top forwardly extending sections 17 and 18. Directly above the finger-receiving recess 14 is a collar 19 which extends in the form of the grotesque clown-faced head 20 upwardly to camouflage or conceal, when possible, the downwardly depending and removable finger-puncturing blade 21 that is either frictionally retained or removably secured to the head 20 directly below the chin 22 in a blade-receiving bore 23 extending into the head 20.

A puncturing blade-receiving opening 24 extends vertically through the collar 19 to communicate with the finger-receiving cavity 14 at the upper portion thereof as shown in FIGS. 1, 2, 4 and 5.

Figure 2:
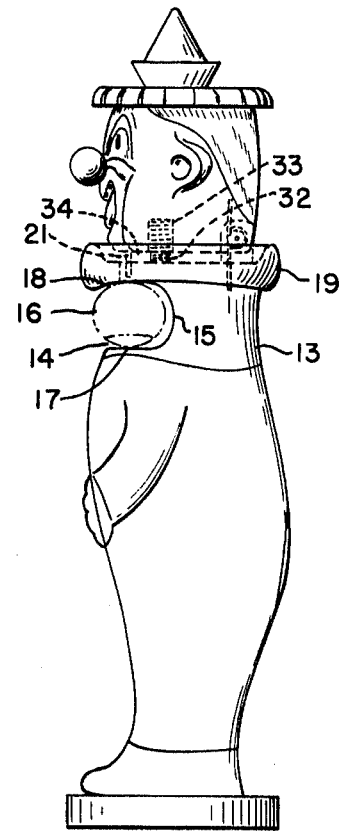
FIG. 2 is a right elevational view of FIG. 1.
Figure 3:
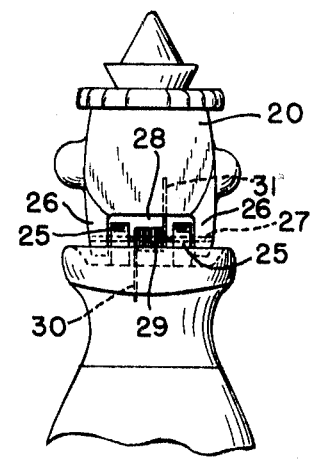
FIG. 3 is a rear elevational view of the top portion only of FIGS. 1 and 2.

Head 20 is pivotally mounted to the body 11 in the collar area 19 by means of the upwardly extending and laterally spaced-apart lugs 25 for cooperatively receiving the downwardly extending and laterally spaced-apart cooperating bosses 26 through which lugs 25 and 26 a head-retaining pin 27 is passed to retain the head 20 in pivotable position on the body 11. A recess 28 is provided in the rear of head 20 to receive the torsion spring 29 on the pin 27 with one terminal spring leg 30 being retained in body 11 and the other leg 31 of torsion spring 29 being secured in head 20 normally to retain the head 20 in the positions shown in FIGS. 1, 2 and 3. A helical spring 32 is securely retained in the spring-receiving cavity 33 in the bottom of head 22 but spaced from the finger-puncturing blade 21 with the spring 32 extending preferably beyond the lower extremity of head 20 to engage the upper portion of collar 19 thereby providing a cushioning space 34 in the normal position of the head as shown in FIGS. 1, 2 and 3 in which position the exposed portion of the finger-puncturing blade 21 may be concealed by collar 19.

Figure 4:
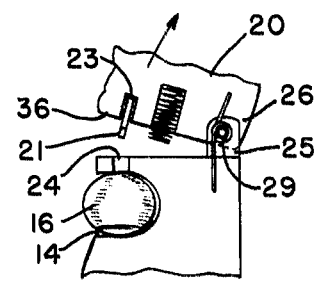
FIG. 4 is a partial longitudinal sectional view of the intermediate portions only of FIGS. 1 through 3 with the head portion being pivoted into the cocked position.
Figure 5:
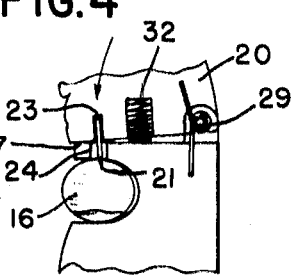
FIG. 5 is a view similar to FIG. 4 illustrating the novelty finger-puncturing device in the puncturing position.

When a child's finger 16 is placed into the finger-receiving cavity 14 as shown in FIG. 4, head 20 may be pivoted clockwise against the action of torsion spring 29 withdrawing finger-puncturing blade 21 from its collar recess 24. Head 22 may be released instantly and there is sufficient spring force from the torsion spring 29 to urge the head counterclockwise, as shown in FIG. 5, to have the blade 21 pass through recess 24 in the collar to penetrate finger 16 a predetermined amount when the chin stop 36 engages the collar stop 37 thereby limiting travel and penetration of the blade 21 into a finger. Helical spring 32 will serve to cushion the movement of head 20 in the counterclockwise direction and, with torsion spring 29, will urge instantaneously the withdrawal of blade 21 from the punctured finger tip.

Finger 16 may then be withdrawn from finger-receiving cavity 14 permitting the technician or doctor to obtain the desired blood sample from the patient. The blade 21 may then be removed readily from the recess 23 and disposed of, and then the novelty finger-puncturing toy may be given to the child or a new sterilized blade introduced ready for the next patient. It is contemplated that the surgical blade or needle suppliers may package the entire novelty finger-puncturing device, after sterilization of the entire assembly, into a sealed container ready for immediate use when opened. However, if desirable, sterilized individually packaged blades may also be used and individually inserted into the device when needed.

It is presently contemplated that the novelty member 10 may be made of plastic such as polyethylene or a thermosetting plastic or any other suitable material which may be subjected to sufficiently high temperatures to be sterilized and made germ free.

Figure 6:
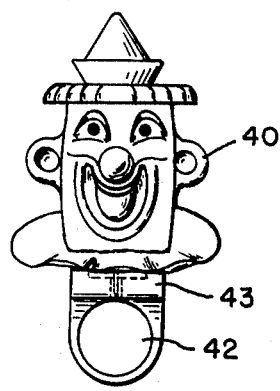
FIG. 6 is a front elevational view of a modified embodiment for the body of a novelty finger-puncturing device in the form of a ring.
Figure 7:
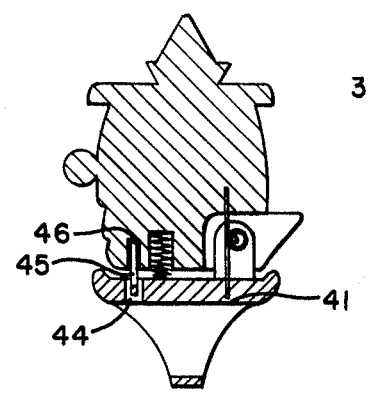
FIG. 7 is a longitudinal sectional view of FIG. 6.

An alternate embodiment of the novelty finger-puncturing device is shown in the form of a grotesque head 40 having substantially the same structure and components shown in FIGS. 1 through 3 except that in place of the self-standing body 11 mounted on the base 12 the base or body is in the form of a finger ring 41 in which the circular finger-receiving recess 42 is formed in the body 41 with the upper portion 43 providing the collar comparable to collar 19 in FIGS. 1 through 3. A blade-receiving recess 44 is positioned in the collar portion 43 for cooperatively receiving the downwardly extending finger-puncturing blade 45 which is removably retained in the blade-receiving recess 46 in head 40. The other portions of the operative mechanism shown in FIG. 7 are substantially identical in construction and operation as heretofore described for the embodiment shown in FIGS. 1 through 3 and FIGS. 4 and 5. However, in the embodiment shown in FIGS. 6 and 7, the child's finger is placed into the finger-receiving opening 42 and the head 40 is then pivoted and released in order to have the finger-puncturing blade 45 pierce the skin. The child's finger is then withdrawn from the ring and the sample of blood obtained. Blade 45 is removed before the novelty member is given to the child as a toy.

As stated previously, the configuration of the head and other components may vary to provide the desired presentation in the form of a toy provided one portion is pivotable relative to another portion with one of the portions retaining a blade for puncturing a finger and the other portion retaining a finger to be punctured by the blade.

I claim:

1. A novelty finger-puncturing device comprising a body member having a cavity therein for receiving the end of a finger to be punctured; a head member pivotally supported on said body resiliently in a normal position intermediate two extreme positions; and finger-puncturing means secured within said head for displacement therewith and into said finger-receiving cavity for puncturing a finger therein.

2. A novelty finger-puncturing device as claimed in claim 1, said body having a finger-puncturing means receiving guide slot communicating with said finger-receiving cavity, said finger-puncturing means in said head being substantially concealed in said slot in the normal position; said head being movable to one extreme position away from said body whereby upon being released, said head and said finger puncturing means will be urged toward said body and said finger-puncturing means will pass through said guide slot into said finger-receiving cavity to puncture a finger positioned therein.

3. A novelty finger-puncturing device as claimed in claim 1, said head and said body having means for limiting displacement of said finger-puncturing means into a finger within said finger-receiving cavity of said body.